(12) United States Patent
Yoshida et al.

(10) Patent No.: US 11,845,844 B2
(45) Date of Patent: Dec. 19, 2023

(54) HOT PRESS CUSHIONING MATERIAL AND PRODUCTION METHOD THEREOF

(71) Applicant: YAMAUCHI CORP., Hirakata (JP)

(72) Inventors: Akira Yoshida, Hirakata (JP); Takamitsu Ozeki, Hirakata (JP)

(73) Assignee: YAMAUCHI CORP., Hirakata (JP)

( * ) Notice: Subject to any disclaimer, the term of this patent is extended or adjusted under 35 U.S.C. 154(b) by 733 days.

(21) Appl. No.: 16/616,897

(22) PCT Filed: May 28, 2018

(86) PCT No.: PCT/JP2018/020299
§ 371 (c)(1),
(2) Date: Nov. 25, 2019

(87) PCT Pub. No.: WO2018/221439
PCT Pub. Date: Dec. 6, 2018

(65) Prior Publication Data
US 2021/0171730 A1    Jun. 10, 2021

(30) Foreign Application Priority Data
Jun. 2, 2017 (JP) ................. 2017-110133

(51) Int. Cl.
*C08J 9/00* (2006.01)
*B29C 43/02* (2006.01)
(Continued)

(52) U.S. Cl.
CPC ............. *C08J 9/0061* (2013.01); *B29C 43/02* (2013.01); *B29C 43/36* (2013.01); *B29C 43/52* (2013.01);
(Continued)

(58) Field of Classification Search
CPC ....... B30B 15/061; B32B 25/10; B32B 25/14; B32B 25/16; B32B 25/18; B32B 25/20; B32B 5/022; B32B 2250/03; B32B 2250/40; B32B 2260/021; B32B 2260/048; B32B 2262/0261; B32B 2262/0269;
(Continued)

(56) References Cited

U.S. PATENT DOCUMENTS 4,879,163 A * 11/1989 Woiceshyn ............ D02G 3/404
428/95
5,334,418 A * 8/1994 Byers ..................... B41N 10/04
427/373

(Continued)

FOREIGN PATENT DOCUMENTS

CN          1413818 A      4/2003
CN     101541500 A      9/2009
(Continued)

OTHER PUBLICATIONS

European Office Action for related European Patent Application No. 18808665.6-1007 dated Feb. 25, 2021, 7 Pages.

*Primary Examiner* — Hai Vo
(74) *Attorney, Agent, or Firm* — DITTHAVONG, STEINER & MLOTKOWSKI

(57) ABSTRACT

A hot press cushioning material includes: a fiber material comprised of a multiplicity of randomly oriented fibers (1); rubber (2) present in voids between the fibers (1) of the fiber material; and independent pores (3) dispersedly present in the rubber (2).

13 Claims, 10 Drawing Sheets

(51) Int. Cl.
    *B29C 43/36* (2006.01)
    *B29C 43/52* (2006.01)
    *B30B 15/06* (2006.01)
    *C08K 7/14* (2006.01)
    *B29K 19/00* (2006.01)
    *B29K 105/12* (2006.01)

(52) U.S. Cl.
    CPC ........... *B30B 15/061* (2013.01); *C08J 9/0085* (2013.01); *C08K 7/14* (2013.01); *B29K 2019/00* (2013.01); *B29K 2105/12* (2013.01); *C08J 2201/026* (2013.01); *C08J 2203/22* (2013.01); *C08J 2315/02* (2013.01); *C08J 2327/16* (2013.01)

(58) Field of Classification Search
    CPC ........ B32B 2262/101; B32B 2262/106; B32B 2262/108; B32B 2307/732; B32B 2457/08; B32B 2457/10; B32B 2457/202; C08J 2201/026; C08J 2203/22; C08J 2315/02; C08J 2321/00; C08J 2327/16; C08J 9/0061; C08J 9/0085; C08J 9/32; C08K 7/14

See application file for complete search history.

(56) References Cited

U.S. PATENT DOCUMENTS

| | | | |
|---|---|---|---|
| 2003/0059576 A1 | 3/2003 | Halterbeck et al. | |
| 2003/0104205 A1* | 6/2003 | Brodeur, Jr. | B32B 5/18 428/374 |
| 2008/0021134 A1* | 1/2008 | Yoshida | B30B 15/061 523/218 |
| 2010/0316864 A1* | 12/2010 | Yoshida | B32B 27/12 427/341 |

FOREIGN PATENT DOCUMENTS

| | | |
|---|---|---|
| EP | 2098350 A1 | 9/2009 |
| EP | 2221161 A1 | 8/2010 |
| EP | 3162527 A1 | 5/2017 |
| JP | 2003-145567 A | 5/2003 |
| JP | 2003128936 A | 5/2003 |
| JP | 2005206988 | 8/2005 |
| JP | 2009137208 A | 6/2009 |
| JP | 4316937 B2 | 8/2009 |
| JP | 2010023504 A | 2/2010 |
| JP | 4843396 B2 | 12/2011 |
| JP | 2013132889 A | 7/2013 |
| JP | 3197305 U | 4/2015 |
| KR | 10-2008-0090476 A | 10/2008 |
| KR | 10-2010-0085109 A | 7/2010 |
| WO | 2014069355 A1 | 5/2014 |

* cited by examiner

EVALUATION RESULTS OF CONFORMABILITY TO UNEVENNESS (height of step: 0.2)

HOT PRESS CUSHIONING MATERIAL AND PRODUCTION METHOD THEREOF

TECHNICAL FIELD

The present invention relates to hot press cushioning materials and production methods thereof. More particularly, the present invention relates to hot press cushioning materials that are used when press forming or thermocompression bonding an intended product in the process of producing a laminate that is a high precision machine component such as a printed circuit board like a flexible printed circuit board or a rigid flexible board, an IC card, a liquid crystal display panel, or a battery, and production methods thereof.

BACKGROUND ART

When producing a laminate such as a printed circuit board, a laminate material, which is an object to be pressed, is placed between heating platens, which are heating and pressing means, and a certain pressure and heat are applied to the laminate material in a press forming or thermocompression bonding process. In order to produce an accurate formed product, it is necessary to uniformly heat and press the entire surface of the laminate material in hot press. For this purpose, hot press is performed with a flat plate-like cushioning material being interposed between the heating platen and the laminate material.

When hot pressing a laminate material (e.g., a flexible printed circuit board) having an uneven surface with a cushioning material being in direct contact with the laminate material or with a release film interposed between the laminate material and the cushioning material, it is necessary that the cushioning material be in contact with the entire uneven surface of the laminate material and conform to protrusions and recesses of the uneven surface and it is also necessary to uniformly transmit a pressure and heat to the entire uneven surface including the protrusions and the recesses, in order to produce an accurate formed product.

A hot press cushioning material disclosed in Japanese Patent No. 4316937 (Patent Literature 1) includes a layer of polyol vulcanization type vulcanized fluororubber and the vulcanized fluororubber has the following properties in order for the hot press cushioning material to have improved conformability to unevenness of an object to be pressed. The vulcanized fluororubber is produced by vulcanizing a composition prepared by mixing 1 to 10 parts by mass of an acid acceptor and 0 to 5 parts by mass of other compounding agent that is added as necessary per a total of 100 parts by mass of raw fluororubber comprised of a vinylidene fluoride-hexafluoropropylene binary copolymer having a number average molecular weight of $3.5 \times 10^4$ to $2.0 \times 10^5$ and a polyol vulcanizing agent. The degree of vulcanization is 90.0% to 98.8% in gel fraction, and the durometer A hardness of the vulcanized fluororubber is A40 to A55.

A hot press cushioning material disclosed in Japanese Patent No. 4843396 (Patent Literature 2) has the following characteristics in order for the hot press cushioning material to be able to be used repeatedly for multiple hot presses and to have excellent cushioning properties, excellent in-plane uniformity, and excellent heat transfer capability. That is, this hot press cushioning material is a composite of paper comprised of a fiber material and rubber with which the paper has been impregnated, and the volume ratio of the fiber material to the rubber is 1/1.5 to 1/7.5 and the void fraction of the composite is 60 to 90%.

CITATION LIST

Patent Literatures

Patent Literature 1: Japanese Patent No. 4316937
Patent Literature 2: Japanese Patent No. 4843396

SUMMARY OF INVENTION

Technical Problem

According to the hot press cushioning materials disclosed in Patent Literatures 1 and 2, conformability to unevenness is improved to some extent. The present invention provides a cushioning material having satisfactory conformability even to larger protrusions and recesses.

The hot press cushioning material of Patent Literature 1 may not have satisfactory conformability to protrusions and recesses having a size of, e.g., 50 μm or more.

The hot press cushioning material of Patent Document 2 has voids therein, but these voids are continuous pores. Since the void fraction of the voids that are continuous pores is as large as about 60 to 90%, this hot press cushioning material is somewhat disadvantageous in terms of conformability to unevenness and resilience after press.

It is an object of the present invention to provide a hot press cushioning material that has excellent conformability to unevenness and has excellent resilience and thus can be used repeatedly and a production method thereof.

Solution to Problem

A hot press cushioning material according to the present invention includes: a fiber material comprised of a multiplicity of randomly oriented fibers; rubber present in voids between the fibers of the fiber material; and independent pores dispersedly present in the rubber.

It is preferable that a volume ratio of the fiber material to the rubber be 1/15 or more and less than 1/7.5, and porosity (void fraction) of the hot press cushioning material be 15 to 70% based on volume.

The independent pores are formed by, e.g., expansion of thermally expandable microcapsules dispersed in the rubber.

The fiber material preferably contains one or more materials selected from the group consisting of glass, rock wool, carbon, polybenzazoles, polyimides, aromatic polyamides, and polyamides.

The rubber preferably contains one or more materials selected from the group consisting of fluororubber, EPM, EPDM, hydrogenated nitrile rubber, silicone rubber, acrylic rubber, and butyl rubber.

In one embodiment, the rubber includes one-side rubber layer located on one of upper and lower sides of a layer of the fiber material, and the one-side rubber layer has independent pores dispersedly present therein. It is preferable that the rubber include the other-side rubber layer located on the other of the upper and lower sides of the layer of the fiber material, and the other-side rubber layer have independent pores dispersedly present therein.

In the above preferred embodiment, it is preferable that a volume ratio of the fiber material to the rubber having the independent pores dispersed therein be 1/75 or more and less than 1/15 and porosity (void fraction) of the hot press cushioning material be 15 to 70% based on volume. It is more preferable that a ratio of a thickness of the layer of the fiber material with the rubber being present in the voids between the fibers to a total thickness of the upper and lower rubber layers be 1/7 or more and 1/1.5 or less.

A method for producing a hot press cushioning material according to the present invention includes the steps of: stacking a fiber material sheet comprised of a multiplicity of randomly oriented fibers and an unvulcanized rubber sheet having thermally expandable microcapsules dispersed therein on top of each other; pressing the stack of the fiber material sheet and the unvulcanized rubber sheet to cause unvulcanized rubber and the microcapsules in the unvulcanized rubber sheet to enter voids between the fibers of the fiber material sheet to form a composite; heating the composite to cause expansion of the microcapsules to form independent pores; and heating the composite to vulcanize the unvulcanized rubber in the composite. The steps may be performed separately, or two or more of the steps may be performed simultaneously or successively.

In one embodiment, the stacking step includes sandwiching the unvulcanized rubber sheet between two of the fiber material sheets.

It is preferable that the step of pressing the fiber material sheet and the unvulcanized rubber sheet to form the composite be performed at a first temperature, the step of forming the independent pores be performed at a second temperature higher than the first temperature, and the vulcanizing step be performed at a third temperature higher than the second temperature. The step of forming the independent pores and the vulcanizing step may be performed simultaneously or successively by continuously increasing the temperature from the second temperature to the third temperature.

In one embodiment, the stacking step includes sandwiching the fiber material sheet between two of the unvulcanized rubber sheets. In this case, it is preferable that the step of forming the composite includes causing a part of each of the unvulcanized rubber sheets containing the microcapsules to enter the voids between the fibers of the fiber material sheet and causing the remaining part of each of the unvulcanized rubber sheets to be located outside the fiber material sheet.

Advantageous Effects of Invention

The present invention having the above configuration provides a hot press cushioning material that has excellent conformability to unevenness and has excellent resilience and thus can be used repeatedly.

DESCRIPTION OF EMBODIMENTS

Figure 1:
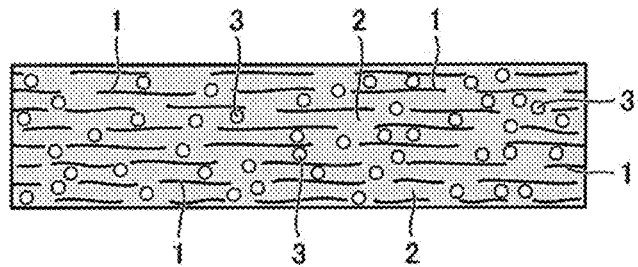
FIG. 1 is an illustrative sectional view of a hot press cushioning material according to an embodiment of the present invention.

A hot press cushioning material shown in FIG. 1 includes a fiber material comprised of a multiplicity of randomly oriented fibres 1, rubber 2 present in the voids between the fibers 1 of the fiber material, and a multiplicity of independent pores 3 dispersedly present in the rubber 2.

The fiber material comprised of the multiplicity of fibers 1 preferably contains one or more materials selected from the group consisting of glass, rock wool, carbon, polybenzazoles, polyimides, aromatic polyamides, and polyamides. The rubber 2 preferably contains one or more materials selected from the group consisting of fluororubber, EPM, EPDM, hydrogenated nitrile rubber, silicone rubber, acrylic rubber, and butyl rubber.

The independent pores 3 are preferably pores formed by expansion of thermally expandable microcapsules. The average particle size of the microcapsules before expansion is about 5 to 50 μm, which is large enough for the microcapsules to easily pass through the voids between the fibers 1 of the fiber material. The average particle size of the microcapsules is more preferably 5 to 40 μm, and even more preferably 10 to 40 μm.

In the embodiment having the structure shown in FIG. 1, in order to maintain satisfactory conformability of the hot press cushioning material to unevenness even after repeated use, the volume ratio of the fiber material to the rubber 2 is 1/15 or more and less than 1/7.5. When the volume ratio of the fiber material to the rubber 2 is less than 1/15, the hot press cushioning material has lower shape retention capability and stretching or tearing of the hot press cushioning material may occur with repeated use. When the volume ratio of the fiber material to the rubber 2 is 1/7.5 or more, the hot press cushioning material does not have sufficient conformability to unevenness. The volume ratio of the fiber material to the rubber is more preferably 1/10 or more and less than 1/7.5.

It is desirable that the porosity (void fraction) of the hot press cushioning material that is a composite of a fiber material and rubber be 15 to 70% based on volume. A hot press cushioning material having porosity of less than 15% does not have sufficient conformability to unevenness. A hot press cushioning material having porosity of more than 70% is not preferable because it has sufficient conformability to unevenness but its cushioning properties are significantly degraded with repeated use. The lower limit of the porosity of the hot press cushioning material is more preferably 20%, and the upper limit thereof is more preferably 60%.

The hot press cushioning material shown in FIG. 1 is produced by the following process.

Figure 2:
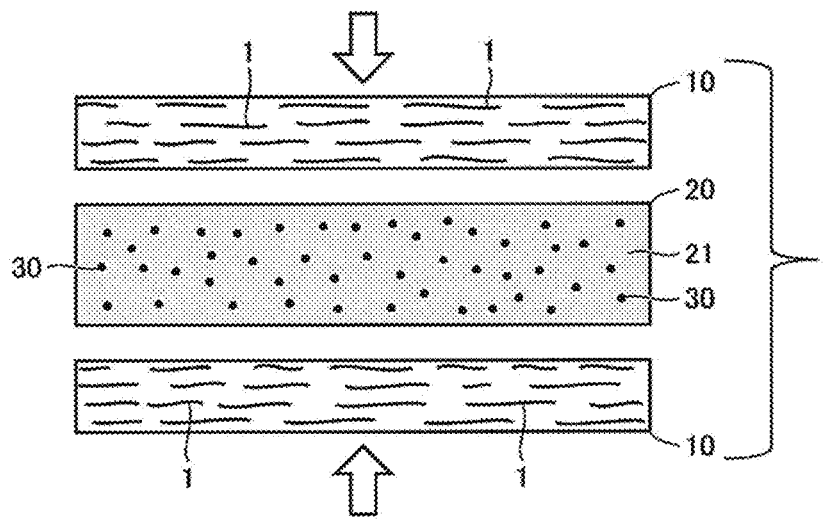
FIG. 2 is an illustration of a method for producing a hot press cushioning material according to an embodiment of the present invention.

As shown in FIG. 2, a fiber sheet 10 comprised of a multiplicity of randomly oriented fibers 1 and an unvulcanized rubber sheet 20 having thermally expandable microcapsules 30 dispersed therein are first prepared. In one embodiment, two fiber sheets 10 are prepared and are stacked on top of each other with the unvulcanized rubber sheet 20 interposed therebetween. The fiber sheet 10 can be in the form of nonwoven fabric or paper but is preferably in the form of paper produced especially by a wet papermaking process. The fiber sheet 10 in the form of paper has in-plane uniformity as fibers are randomly oriented in the in-plane direction in paper. In order for unvulcanized rubber 21 and the microcapsules 30 to enter the voids between the fibres 1, the fiber sheet 10 preferably has a void fraction of 84 to 99%.

Figure 17:
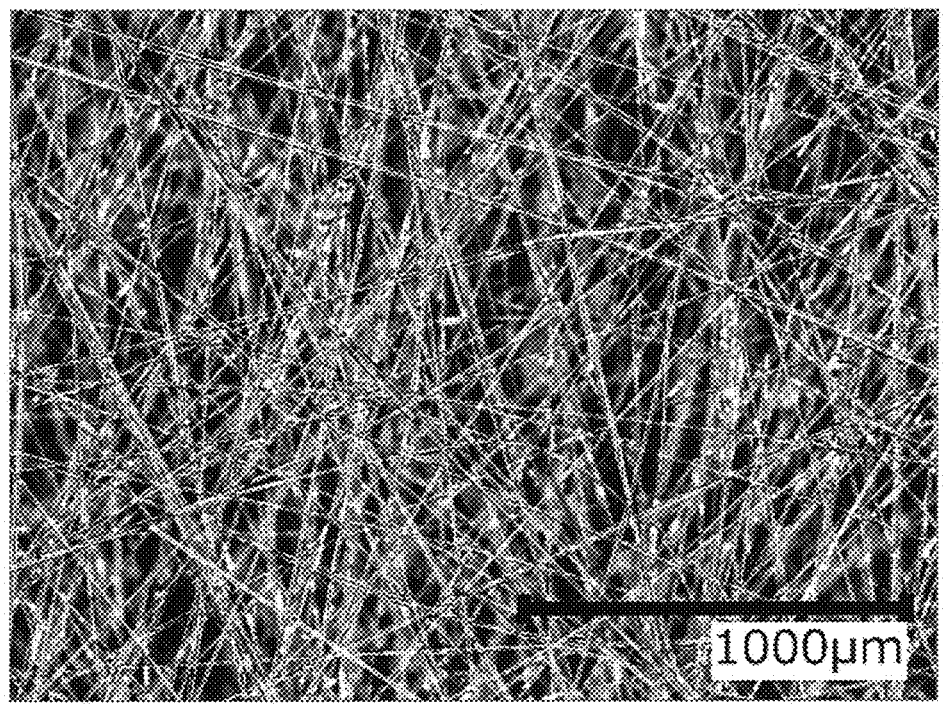
FIG. 17 is an image of the surface of glass paper as a preferred example of a fiber sheet.

FIG. 17 is an image of the surface of glass paper that is a preferred example of the fiber sheet 10. This glass paper has a void fraction of 95%. As can be seen from the figure, glass fibers are randomly oriented in the in-plane direction in this glass paper.

Figure 18:
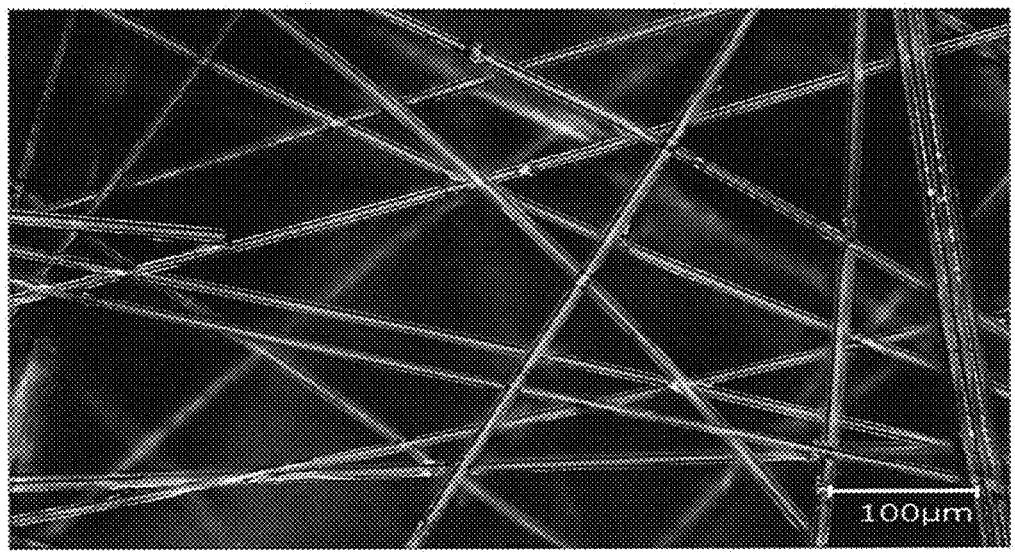
FIG. 18 is an enlarged image of FIG. 17.

FIG. 18 is an enlarged image of FIG. 17. As can be seen from FIG. 18, this glass paper has a high void fraction. Accordingly, the unvulcanized rubber 21 and the microcapsules 30 can be caused to enter the voids between the fibers 1 by stacking the glass paper and the unvulcanized rubber sheet 20 on top of each other and pressing the stack of the glass paper and the unvulcanized rubber sheet 20.

The fiber sheets 10 and the unvulcanized rubber sheet 20 stacked on top of each other as shown in FIG. 2 are pressed to from a composite sheet. This pressing is performed by heating to a first temperature. The first temperature is a temperature that is not high enough to cause expansion of the microcapsules 30 and is, e.g., about 100 to 115° C. The pressing force is, e.g., about 4 MPa and the pressing time is, e.g., about 60 minutes at high temperatures (about 110° C.) and then about 40 minutes at room temperature.

Figure 3:
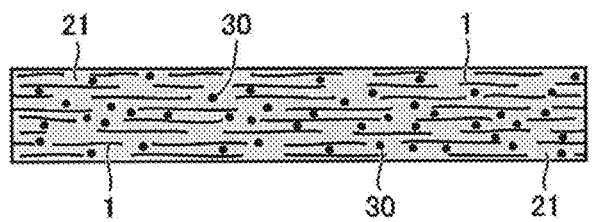
FIG. 3 is an illustrative sectional view of a composite obtained by the pressing step shown in FIG. 2.

By this pressing, the unvulcanized rubber 21 in the unvulcanized rubber sheet 20 enters the voids between the multiplicity of fibers 1 in the fiber sheet 10, as shown in FIG. 3. Similarly, the microcapsules 30 dispersed in the unvulcanized rubber 21 also enter the voids between the multiplicity of fibers 1. The microcapsules 30 have not expanded in this state.

The fiber-rubber composite sheet shown in FIG. 3 is heated to a second temperature higher than the first temperature to cause expansion of the thermally expandable microcapsules 30 to form the independent pores 3. The independent pores 3 are independent air bubbles that are completely closed, and are distinguished from continuous pores (continuous air bubbles) having a void communicating with the outside. The second temperature is a temperature at which the thermally expandable microcapsules 30 expand and is, e.g., about 120 to 140° C.

The fiber-rubber composite sheet is then further heated to a third temperature higher than the second temperature to vulcanize the unvulcanized rubber 21. The hot press cushioning material shown in FIG. 1 is thus produced. The third temperature is, e.g., a temperature equal to or higher than 150° C. Expansion of the thermally expandable microcapsules may be caused when the temperature passes the second temperature during heating to the third temperature. The rubber 2 has been vulcanized in the state of FIG. 1.

The inventors produced several kinds of example samples and several kinds of comparative example samples and compared and evaluated their structures and properties such as conformability to unevenness. The average particle size of commercially available thermally expandable microcapsules (before expansion) is about 5 to 50 μm. Specific examples of the commercially available thermally expandable microcapsules include "Expancel" (average particle size: 10 to 40 μm) made by Japan Fillite Co., Ltd., "Matsumoto Microsphere" (average particle size: 5 to 50 μm) made by Matsumoto Yushi-Seiyaku Co., Ltd., and "KUREHA Microsphere" (average particle size: 10 to 50 μm) made by KUREHA CORPORATION. The thermally expandable microcapsules used in the example samples were "Expancel 920-DU40" made by Japan Fillite Co., Ltd., whose average particle size was 10 to 16 μm.

Example Sample 1

A. Preparation of Materials

Two fiber material sheets (two sheets of glass paper) comprised of a multiplicity of randomly oriented glass fibers were prepared. The glass paper used was "GRABESTOS SYS-80" made by ORIBEST CO., LTD. The glass paper had a thickness of 0.57 mm, a basis weight of 80 g/m$^2$, and a void fraction of 95%.

Thermally expandable microcapsules were also prepared. The thermally expandable microcapsules used were "Expancel 920-DU40" made by Japan Fillite Co., Ltd. 5 parts by mass of the thermally expandable microcapsules were mixed per 100 parts by mass of fluororubber, and the mixture was kneaded to prepare an unvulcanized fluororubber sheet with a thickness of 0.6 mm. The unvulcanized fluororubber sheet had the thermally expandable microcapsules dispersed therein.

B. Primary Press

Figure 4:
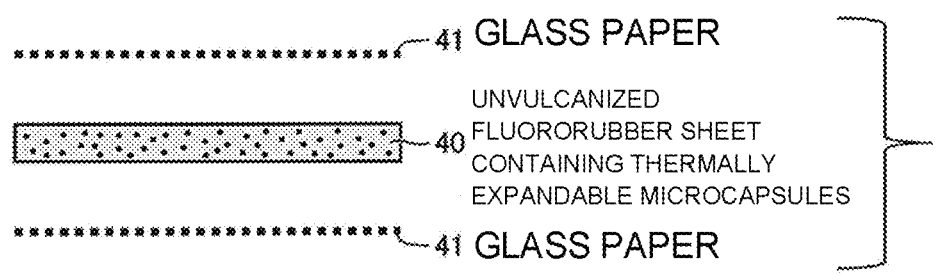
FIG. 4 is an illustrative sectional view of a fluororubber sheet containing thermally expandable microcapsules and two sheets of glass paper before being pressed into a composite.

As shown in FIG. 4, an unvulcanized fluororubber sheet 40 containing thermally expandable microcapsules and having a thickness of 0.6 mm was sandwiched between two sheets 41 of glass paper, and the stack of the unvulcanized fluororubber sheet 40 and the two sheets 41 of glass paper was hot pressed to form a composite sheet.

This pressing was performed under the following conditions.

Temperature: 110° C.
Pressure: 4 MPa
Pressing Time: 60 minutes at high temperatures and 40 minutes at room temperature C. Expansion of Microcapsules and Vulcanization of Rubber The resultant fiber-rubber composite sheet 50 (FIG. 5) was heated in a heating oven and held therein for a predetermined time to cause expansion of the thermally expandable microcapsule and to vulcanize the fluororubber and bake the fiber-rubber composite sheet 50. The temperature and the holding time in the heating oven were 230° C. and 5 hours. The thermally expandable microcapsules expanded during heating to form a multiplicity of independent air bubbles in the fiber-rubber composite sheet 50. The volume ratio of the fiber material to the rubber in the fiber-rubber composite sheet 50 was 1/9.5.

D. Secondary Press

Figure 5:
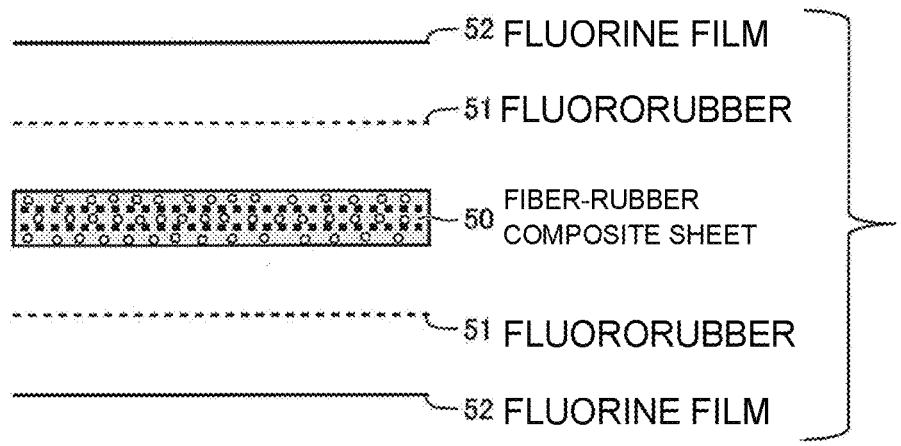
FIG. 5 is an illustrative sectional view of a multilayered structure of Example Sample 1.

As shown in FIG. 5, a fluorine film (thickness: 12 μm) 52 was bonded to both surfaces of the fiber-rubber composite sheet 50 with a fluororubber sheet 51 (thickness: 50 μm) interposed therebetween by hot press. Example sample 1 was thus produced.

Example Sample 2

5 parts by mass of the thermally expandable microcapsules used in Example Sample 1 were mixed per 100 parts by mass of fluororubber to prepare an unvulcanized fluororubber sheet with a thickness of 0.5 mm.

The other conditions (glass paper, primary press, thermal expansions of capsules, vulcanization, and secondary press) are the same as those in Example Sample 1. The volume ratio of the fiber material to the rubber in the fiber-rubber composite sheet 50 was 1/7.9.

Example Sample 3

3 parts by mass of the thermally expandable microcapsules used in Example Sample 1 were mixed per 100 parts by mass of fluororubber to prepare an unvulcanized fluororubber sheet with a thickness of 0.6 mm.

The other conditions (glass paper, primary press, thermal expansions of capsules, vulcanization, and secondary press) are the same as those in Example Sample 1. The volume ratio of the fiber material to the rubber in the fiber-rubber composite sheet 50 was 1/9.5.

Example Sample 4

7 parts by mass of the thermally expandable microcapsules used in Example Sample 1 were mixed per 100 parts by mass of fluororubber to prepare an unvulcanized fluororubber sheet with a thickness of 0.6 mm.

The other conditions (glass paper, primary press, thermal expansions of capsules, vulcanization, and secondary press) are the same as those in Example Sample 1. The volume ratio of the fiber material to the rubber in the fiber-rubber composite sheet 50 was 1/9.5.

[Comparison of Mixing Ratio and Thickness among Example Samples 1 to 4]

The amount of thermally expandable microcapsules, the thickness of the unvulcanized fluororubber sheet, the thickness after primary press, the thickness after expansion and vulcanization, and the thickness after secondary press of Example Samples 1 to 4 are shown in Table 1 below.

TABLE 1

| | Specifications of Material for Primary Press | | Product Thickness | | |
|---|---|---|---|---|---|
| | Amount of Thermally Expandable Microcapsules (Per 100 Parts of Fluororubber) | Thickness of Unvulcanized Fluororubber Sheet | Thickness After Primary Press | Thickness After Expansion and Vulcanization | Thickness After Secondary Press |
| Example Sample 1 | 5 parts | 0.6 mm | 0.61 mm | 2.41 mm | 1.32 mm |
| Example Sample 2 | 5 parts | 0.5 mm | 0.51 mm | 2.30 mm | 1.20 mm |
| Example Sample 3 | 3 parts | 0.6 mm | 0.61 mm | 2.12 mm | 1.14 mm |
| Example Sample 4 | 7 parts | 0.6 mm | 0.61 mm | 2.81 mm | 1.60 mm |

Comparative Example Sample 1

Figure 6:
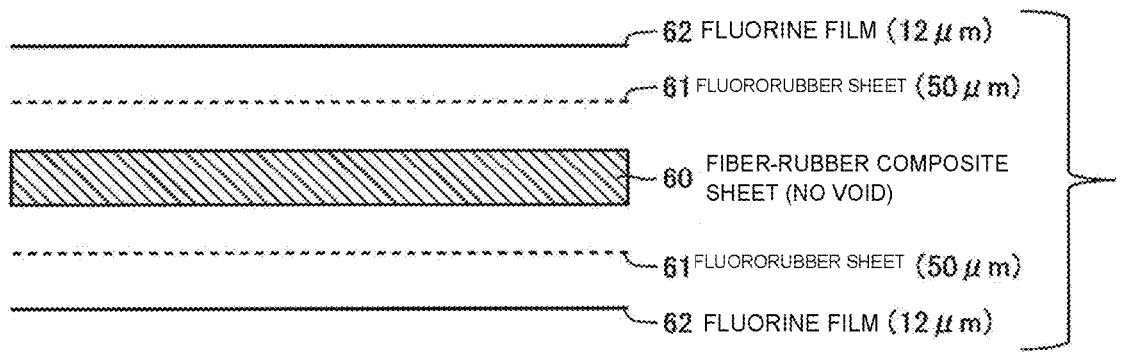
FIG. 6 is an illustrative sectional view of a multilayered structure of Comparative Example Sample 1.

Comparative Example Sample 1 shown in FIG. 6 was produced under the same conditions as those of Example Sample 1 except that no thermally expandable microcapsules were mixed with fluororubber. No independent pores were formed in a fiber-rubber composite sheet 60. The volume ratio of the fiber material to the rubber in the fiber-rubber composite sheet 60 was 1/9.5.

Comparative Example Sample 2

Figure 7:
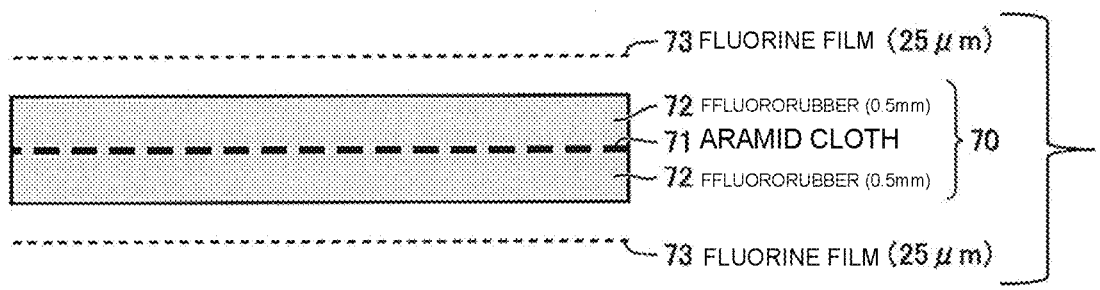
FIG. 7 is an illustrative sectional view of a multilayered structure of Comparative Example Sample 2.

As shown in FIG. 7, Comparative Example Sample 2 is a fiber-rubber composite sheet 70 having fluorine films 73 (thickness: 25 μm) bonded to its both surfaces. The fiber-rubber composite sheet 70 is a composite sheet of aramid cloth 71 comprised of aromatic polyamide fibers serving as a reinforcing material and fluororubber (thickness: 0.5 mm, durometer A hardness: 60°) 72 on both surfaces of the aramid cloth 71. The fiber-rubber composite sheet 70 has no independent pores formed therein.

Comparative Example Sample 3

Comparative Example Sample 3 is a fiber-rubber composite sheet produced by impregnating glass paper "GRABESTOS SYS-80" made by ORIBEST CO., LTD. with fluororubber and has voids (continuous pores) therein. This fiber-rubber composite sheet is described in Japanese Patent No. 4843396. The void fraction of the fiber-rubber composite sheet was 85%, the volume ratio of the fiber material to the rubber was 1/2.2, and the thickness was 0.64 mm.

Comparative Example Sample 4

Figure 8:
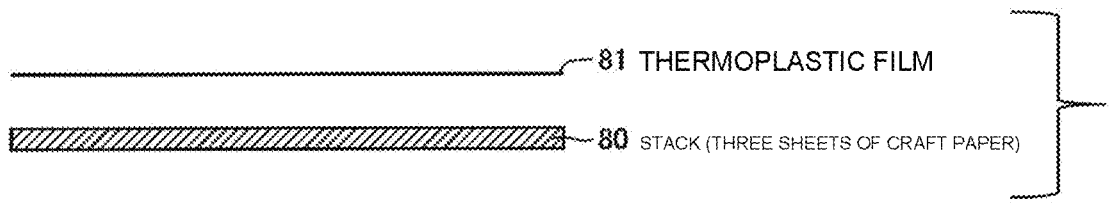
FIG. 8 is an illustrative sectional view of a multilayered structure of Comparative Example Sample 4.
Figure 9:
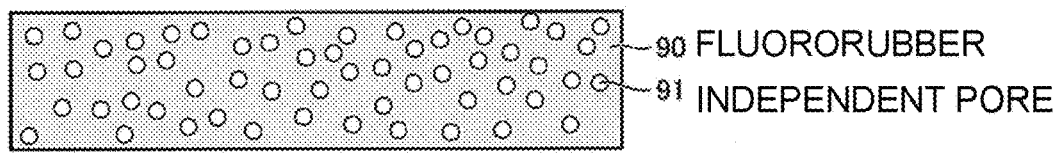
FIG. 9 is an illustrative sectional view of Comparative Example Sample 5.

As shown in FIG. 8, Comparative Example Sample 4 was produced by bonding a thermoplastic film 81 to one surface of a stack 80 of three sheets of craft paper having a basis weight of 190 g/m$^2$.

Comparative Example Sample 5

Comparative Example Sample 5 is a fluororubber sheet 90 having a multiplicity of independent pores 91 therein. The fluororubber sheet 90 contains no fibers. The thickness of the fluororubber sheet 90 was 1 mm and the hardness (durometer A hardness) thereof was 22°.

[Evaluation of Conformability to Unevenness]

Figure 10:
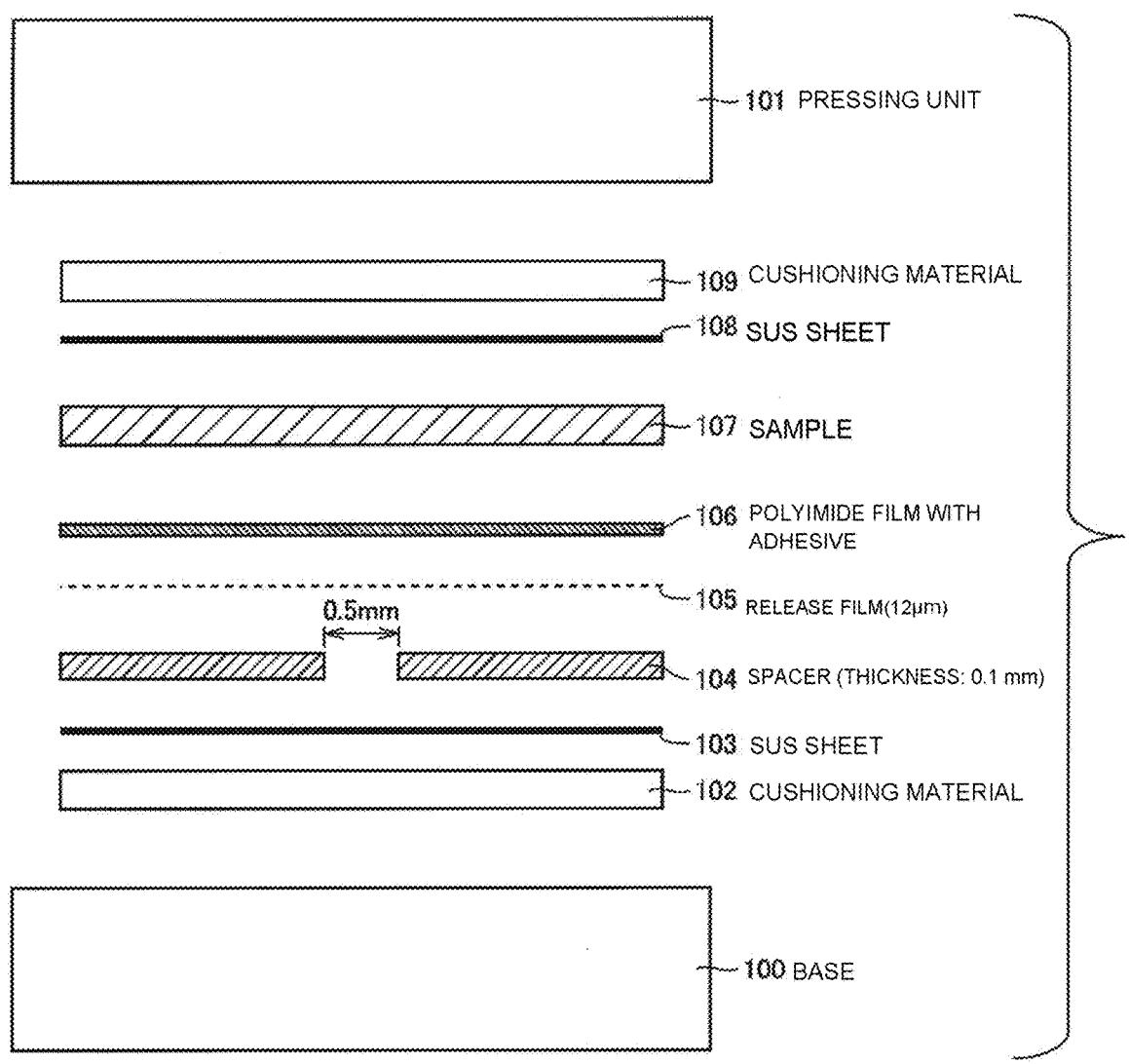
FIG. 10 is an illustrative sectional view illustrating the configuration of a press that is used to evaluate samples' conformability to unevenness.

Each sample's conformability to unevenness was evaluated by a press test. FIG. 10 illustrates the configuration of a press.

A base 100 and a pressing unit 101 of the press contain a heater. A cushioning material 102, a stainless steel sheet 103, a spacer 104 with a thickness of 0.1 mm, a release film 105 made of fluororesin and having a thickness of 12 μm, a polyimide film 106 with adhesive, a sample 107 to be evaluated, a stainless steel sheet 108, and a cushioning material 109 were placed in this order from bottom to top between the base 100 and the pressing unit 101. The cushioning materials 102, 109 were stacks of five sheets of craft paper having a basis weight of 190 g/m².

The spacer 104 with a thickness of 0.1 mm has a slit with a width of 0.5 mm. A step (unevenness) with a depth of 0.1 mm is therefore formed by the lower stainless steel sheet 103 and the spacer 104 placed thereon. The sample 107 to be evaluated is pressed down and heated by the pressing unit 101 to cure the adhesive on the polyimide film 106. Conformability to unevenness was evaluated from formation of a void in the stepped portion by the adhesive on the polyimide film 106.

The pressing for evaluation was performed under the following conditions.

Temperature: 200° C.
Pressure: 2 MPa
Pressing Time: 60 minutes at high temperatures and 15 minutes at room temperature FIG. 11 shows images of the polyimide film 106 in the stepped portion after single press.

Figure 11:
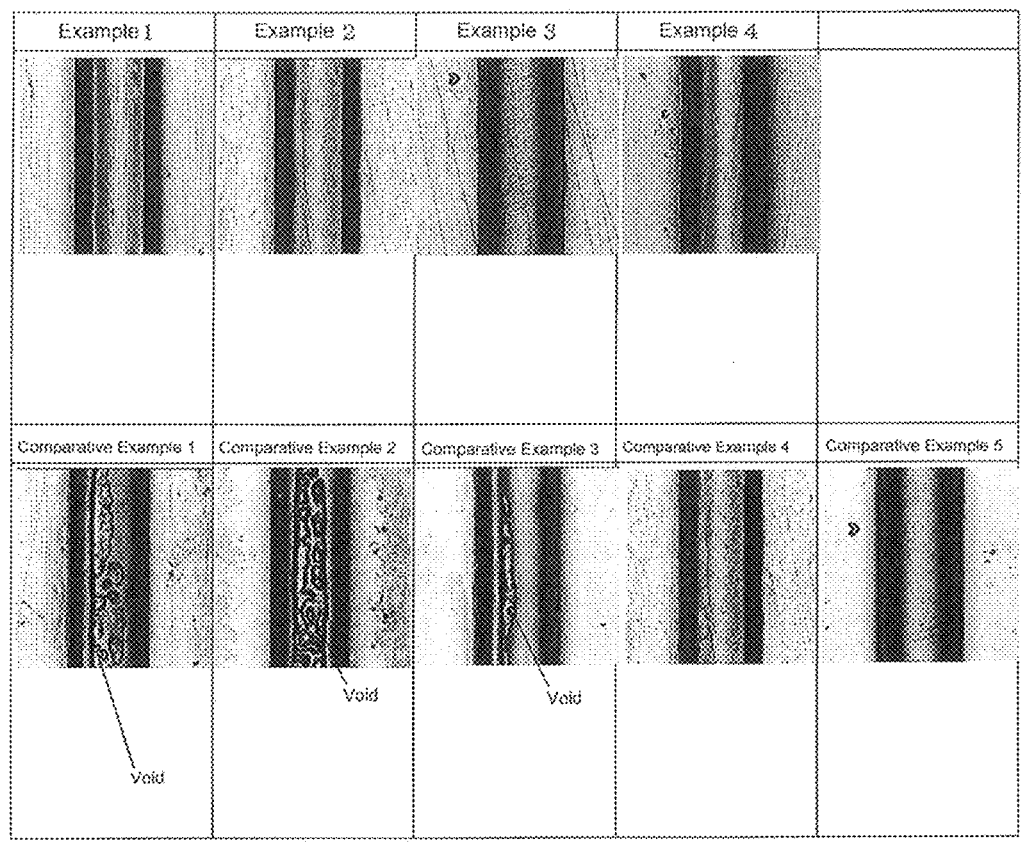
FIG. 11 shows images of a polyimide film in a stepped portion after single press of samples to be evaluated.

The images of FIG. 11 show that, in Example Samples 1 to 4, the sample 107 entered the stepped portion (recess) and an appropriate pressure was applied to the stainless steel sheet 103 located under the slit of the spacer 104. In other words, Example Samples 1 to 4 had satisfactory conformability to unevenness.

The images of FIG. 11 also show that, in Comparative Example Samples 1 to 3, a void was formed in the stepped portion (recess) and an appropriate pressure was not applied. In other words, Comparative Example Samples 1 to 3 do not have sufficient conformability to unevenness. In Comparative Example Samples 4 and 5, no void was formed after single press. Comparative Example Samples 4 and 5 had satisfactory conformability to unevenness after single press.

Figure 12:
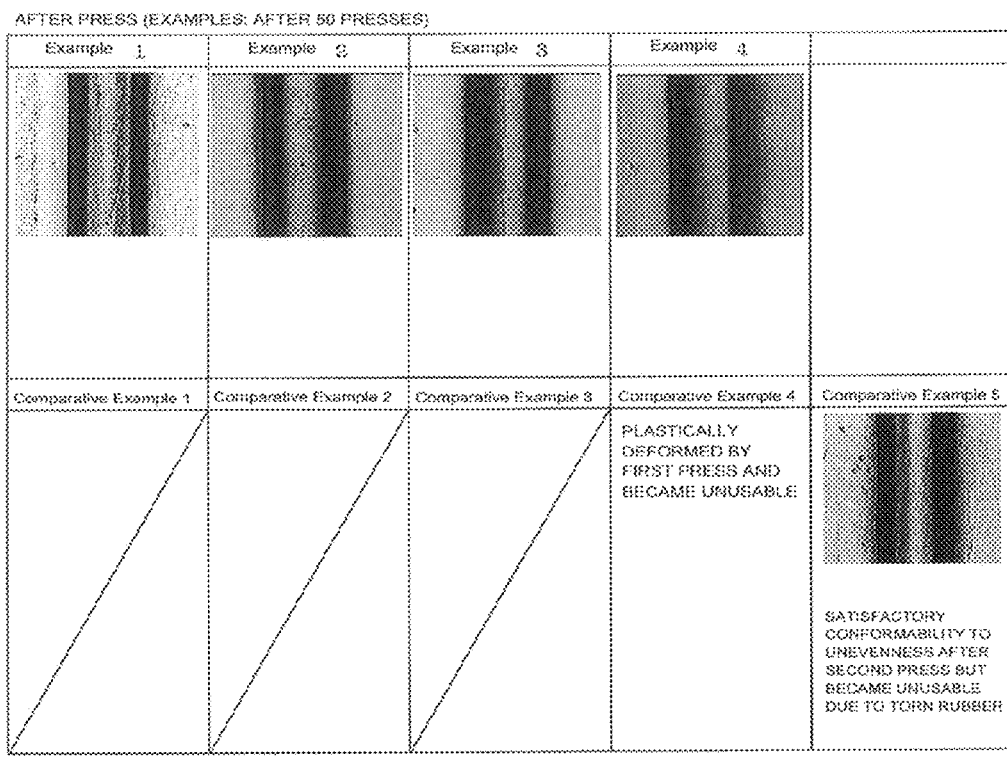
FIG. 12 shows images of the polyimide film in the stepped portion after 50 presses of the samples to be evaluated.

FIG. 12 show images of the polyimide film 106 in the stepped portion after 50 presses. The images of FIG. 12 show that, in Example Samples 1 to 4, an appropriate pressure was applied to the stainless steel sheet 103 located under the slit of the spacer 104 even after 50 presses. In other words, Example Samples 1 to 4 had satisfactory conformability to unevenness even after 50 presses.

Pressing was not able to be performed 50 times on Comparative Example Samples 4 and 5 that had satisfactory conformability to unevenness after the first press. Specifically, Comparative Example Sample 4 was plastically deformed by the first press and became unusable. Comparative Example Sample 5 had satisfactory conformability to unevenness after the second press but became unusable due to torn rubber.

[Structure and Conformability to Unevenness of Samples to be Evaluated]

The structure of the samples to be evaluated and the evaluation results of their conformability to unevenness are shown in Table 2 below.

TABLE 2

| | Samples to be Evaluated | Initial | Single Press | 10 Presses | 50 Presses |
|---|---|---|---|---|---|
| Example 1 | Conformability to Unevenness (Step: 0.1 mm) | | Satisfactory | Satisfactory | Satisfactory |
| | State | | Satisfactory | Satisfactory | Satisfactory |
| | Fiber/Rubber Volume Ratio | 1/9.5 | 1/9.5 | 1/9.5 | 1/9.5 |
| | Void Fraction | 50% | 45% | 41% | 32% |
| | Thickness | 1.32 mm | 1.21 mm | 1.13 mm | 0.98 mm |
| Example 2 | Conformability to Unevenness (Step: 0.1 mm) | | Satisfactory | Satisfactory | Satisfactory |
| | State | | Satisfactory | Satisfactory | Satisfactory |
| | Fiber/Rubber Volume Ratio | 1/7.9 | 1/7.9 | 1/7.9 | 1/7.9 |
| | Void Fraction | 53% | 49% | 45% | 37% |
| | Thickness | 1.20 mm | 1.10 mm | 1.03 mm | 0.91 mm |
| Example 3 | Conformability to Unevenness (Step: 0.1 mm) | | Satisfactory | Satisfactory | Satisfactory |
| | State | | Satisfactory | Satisfactory | Satisfactory |
| | Fiber/Rubber Volume Ratio | 1/9.5 | 1/9.5 | 1/9.5 | 1/9.5 |
| | Void Fraction | 42% | 39% | 34% | 26% |
| | Thickness | 1.14 mm | 1.08 mm | 1.00 mm | 0.90 mm |
| Example 4 | Conformability to Unevenness (Step: 0.1 mm) | | Satisfactory | Satisfactory | Satisfactory |
| | State | | Satisfactory | Satisfactory | Satisfactory |
| | Fiber/Rubber Volume Ratio | 1/9.5 | 1/9.5 | 1/9.5 | 1/9.5 |
| | Void Fraction | 59% | 54% | 40% | 31% |
| | Thickness | 1.60 mm | 1.45 mm | 1.10 mm | 0.96 mm |
| Comparative Example 1 | Conformability to Unevenness (Step: 0.1 mm) | | Void Formed | — | — |
| | State | | — | — | — |
| | Fiber/Rubber Volume Ratio | 1/9.5 | — | — | — |
| | Void Fraction | 0% | — | — | — |
| | Thickness | 0.61 mm | — | — | — |

TABLE 2-continued

| Samples to be Evaluated | | Initial | Single Press | 10 Presses | 50 Presses |
|---|---|---|---|---|---|
| Comparative Example 2 | Conformability to Unevenness (Step: 0.1 mm) | | Void Formed | — | — |
| | State | | — | — | — |
| Comparative Example 3 | Conformability to Unevenness (Step: 0.1 mm) | | Void Formed | — | — |
| | State | | — | — | — |
| Comparative Example 4 | Conformability to Unevenness (Step: 0.1 mm) | | Satisfactory | — | — |
| | State | | Became unusable due to plastic deformation | — | — |
| Comparative Example 5 | Conformability to Unevenness (Step: 0.1 mm) | | Satisfactory | — | — |
| | State | | Significant change over time stretched out and torn became unusable | — | — |

[Sectional Images of Example Sample 1 and Comparative Example Sample 3]

Figure 13:
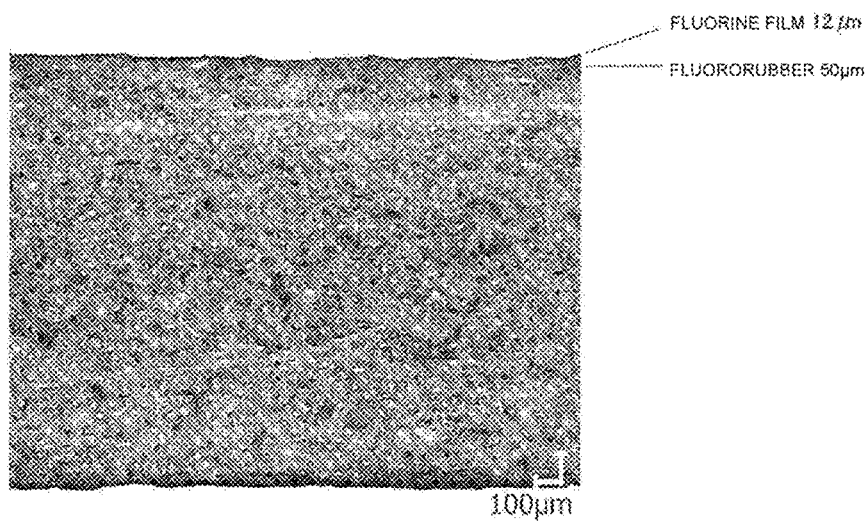
FIG. 13 is a sectional image of Example Sample 1 having the structure shown in FIG. 5.

FIG. 13 is a sectional image of Example Sample 1 having the structure shown in FIG. 5. Example Sample 1 is a fiber-rubber composite sheet having a fluorine film bonded to its both surfaces with a 50 μm thick fluororubber layer interposed therebetween.

Figure 14:
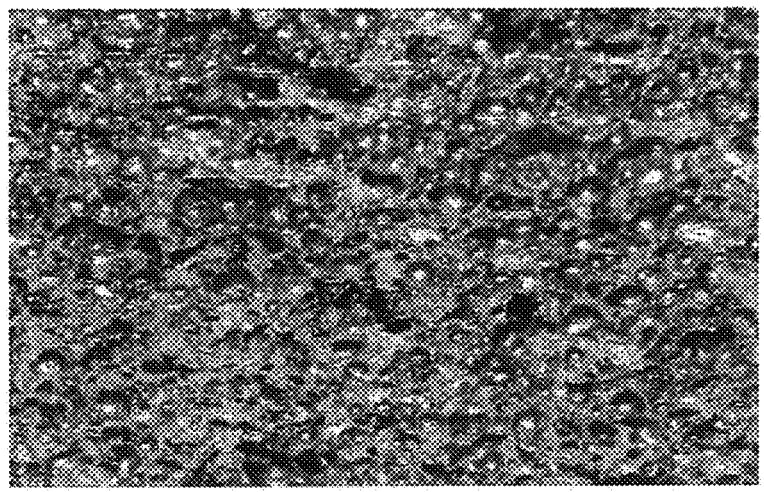
FIG. 14 is an enlarged sectional image of a fiber-rubber composite sheet shown in FIG. 13 in the thickness direction.
Figure 15:
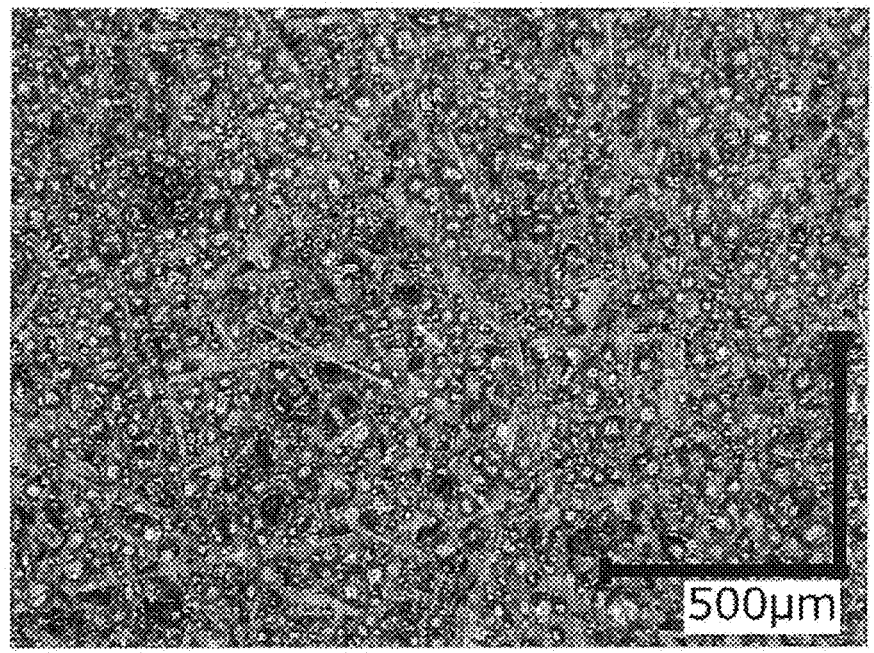
FIG. 15 is an enlarged sectional image of the fiber-rubber composite sheet shown in FIG. 13 in the in-plane direction.

FIG. 14 is an enlarged sectional image of the fiber-rubber composite sheet, which is a core layer, of Example Sample 1 in the thickness direction. FIG. 15 is an enlarged sectional image thereof in the in-plane direction. As can be seen from these sectional images, the fiber-rubber composite sheet has fluororubber in the voids between a multiplicity of randomly oriented glass fibers and has a multiplicity of independent pores formed in the fluororubber. The size (maximum diameter) of the independent pores is 15 to 115 μm.

Figure 16:
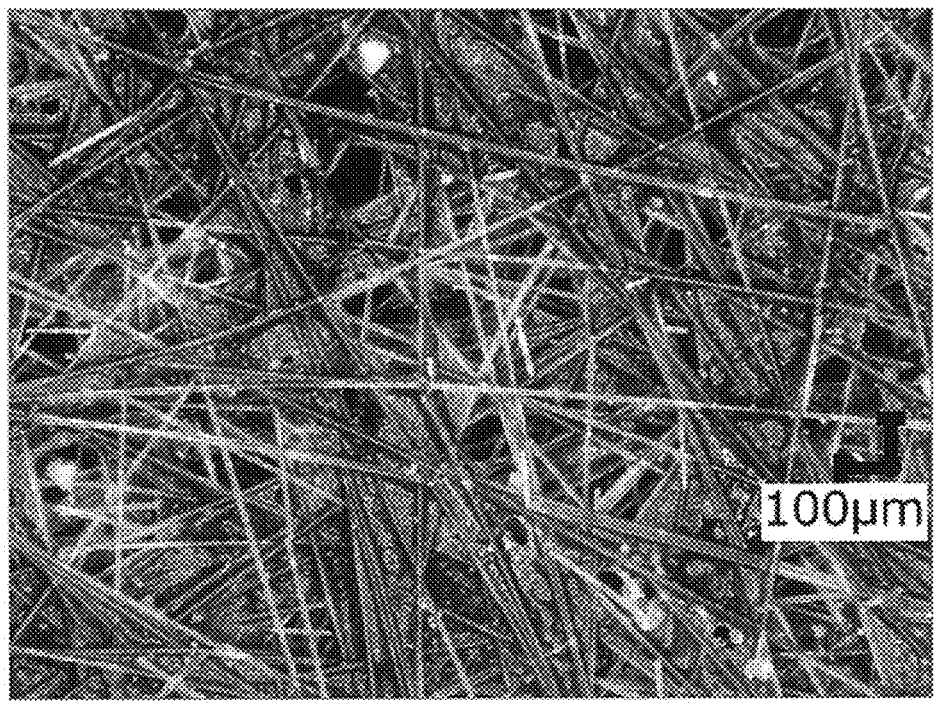
FIG. 16 is an enlarged image of a fiber-rubber composite sheet of Comparative Example Sample 3 in the in-plane direction.

FIG. 16 is an enlarged image of the fiber-rubber composite sheet of Comparative Example Sample 3 in the in-plane direction. This enlarged image shows that the fiber-rubber composite sheet has fluororubber between a multiplicity of glass fibers and has continuous pores formed therein. The void fraction of this composite sheet is 85% and the volume ratio of the fiber material to the rubber is 1/2.2.

[Various Forms of Hot Press Cushioning Material]

The hot press cushioning material according to the invention can be in various forms. One form is a fiber-rubber composite sheet including a fiber material comprised of a multiplicity of fibres 1, rubber 2 present in the voids between the fibres 1, and independent pores 3 dispersedly present in the rubber 2, as shown in FIG. 1.

Other possible forms include the fiber-rubber composite sheet with the structure of FIG. 1 having fluorine films bonded to its both surfaces with very thin fluororubber interposed therebetween, the fiber-rubber composite sheet with the structure of FIG. 1 having a surface layer material bonded to its one or both surfaces, a plurality of the fiber-rubber composite sheets with the structure of FIG. 1 having a nonwoven fabric layer, a woven fabric layer, a rubber layer, etc. interposed therebetween.

Figure 19:
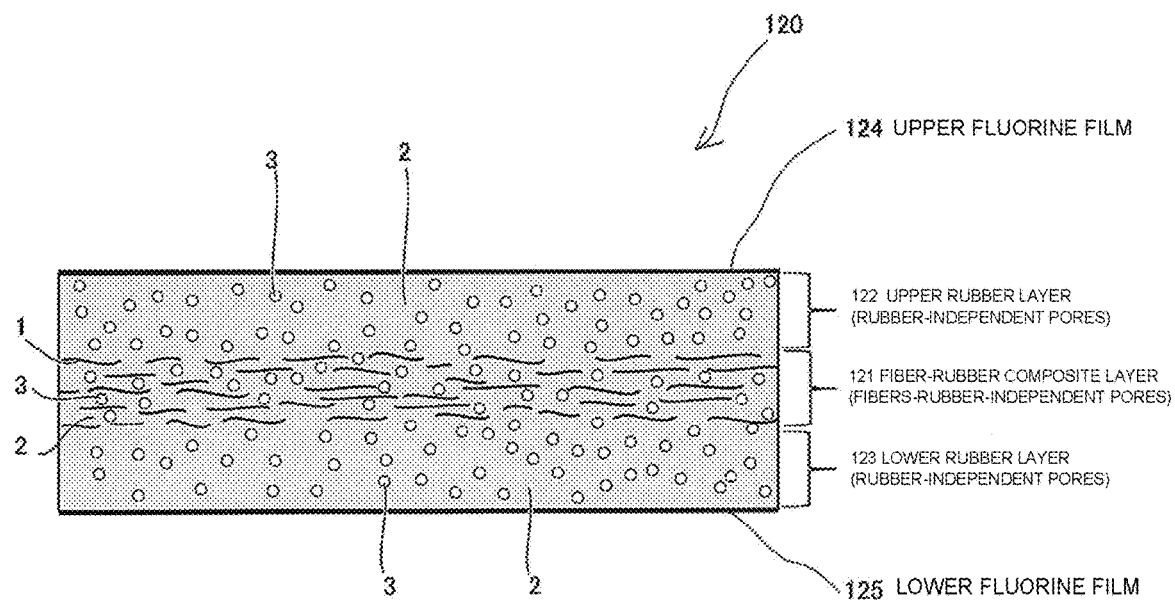
FIG. 19 is an illustrative sectional view of a hot press cushioning material according to another embodiment of the present invention.

FIG. 19 is an illustrative sectional view of a heat press cushioning material according to another embodiment of the present invention. A hot press cushioning material 120 shown in the figure includes a fiber-rubber composite layer 121 having the same structure as that shown in FIG. 1, an upper rubber layer 122 located over the fiber-rubber composite layer 121, a lower rubber layer 123 located under the fiber-rubber composite layer 121, an upper fluorine film 124 placed on the front surface of the upper rubber layer 121, a lower fluorine film 125 placed on the back surface of the lower rubber layer 123.

The fiber-rubber composite layer 121 includes a fiber material comprised of a multiplicity of randomly oriented fibres 1, rubber 2 present in the voids between the fibers 1 of the fiber material, and independent pores 3 dispersedly present in the rubber 2. The upper rubber layer 122 is located over the layer of the fiber material and includes independent pores 3 dispersedly present therein. The lower rubber layer 123 is located under the layer of the fiber material and includes independent pores 3 dispersedly present therein.

The upper fluorine film 124 and the lower fluorine film 125 form a front surface layer and a back surface layer of the hot press cushioning material and have heat resistance. Although a fluorine film is used as a heat resistant film in the illustrated embodiment, heat resistant films made of other materials may be used.

In the embodiment having the structure shown in FIG. 19, the volume ratio of the fiber material to the entire rubber 2 having the independent pores 3 dispersed therein is preferably 1/75 or more and less than 1/15 in order to maintain satisfactory conformability of the hot press cushioning material to unevenness even with repeated use. When the volume ratio of the fiber material to the rubber 2 is less than 1/75, the hot press cushioning material 120 has insufficient reinforcement capability, and the hot press cushioning material 120 may be stretched out, torn, etc. with repeated use. When the volume ratio of the fiber material to the rubber 2 is 1/15 or more, the hot press cushioning material 120 has insufficient conformability to unevenness. In the case of the structure shown in FIG. 19, the volume ratio of the fibrous material to the rubber is more preferably 1/60 or more and less than 1/20.

In the case of the hot press cushioning material 120 having the structure shown in FIG. 19, it is desirable that the porosity (void fraction) of the hot press cushioning material be 15 to 70% based on volume. When the porosity is less than 15%, the hot press cushioning material 120 has insufficient conformability to unevenness. When the porosity is higher than 70%, the hot press cushioning material 120 has sufficient conformability to unevenness but has poor resilience. The hot press cushioning material 120 therefore significantly changes over time with repeated use, and distinguishing marks of protrusions and recesses are left on the hot press cushioning material 120. Moreover, since the upper and lower rubber layers (rubber-independent pores) 122, 123 have lower strength, the hot press cushioning material 120 may have surface cracks, may be torn, etc. In the case of the structure shown in FIG. 19, the lower limit of the porosity of the hot press cushioning material is more preferably 20%, and the upper limit of the porosity thereof is more preferably 60%.

Regarding the component ratio of the fiber-rubber composite layer (fibers-rubber-independent pores) 121, the volume ratio of the fiber material to the rubber is preferably 1/15 or more and less than 1/2, and more preferably 1/13 or more and less than 1/3. When the volume ratio is less than 1/15, the hot press cushioning material has insufficient reinforcement capability, and the hot press cushioning material may be stretched out, torn, etc. When the volume ratio is 1/2 or more, the hot press cushioning material has insufficient conformability to unevenness.

Regarding the ratio of the thickness between the fiber-rubber composite layer 121 and the upper and lower rubber layers 122, 123, the ratio of the thickness of the fiber-rubber composite layer 121 to the total thickness of the upper and lower rubber layers 122, 123 is preferably 1/7 to 1/1.5, and more preferably 1/6 to 1/2. When this thickness ratio is less than 1/7, the hot press cushioning material has insufficient reinforcement capability, and the hot press cushioning material may be stretched out, torn, etc. When the thickness ratio is higher than 1/1.5, the hot press cushioning material has insufficient conformability to unevenness.

The hot press cushioning material 120 having the structure shown in FIG. 19 is produced by the following process.

Figure 20:
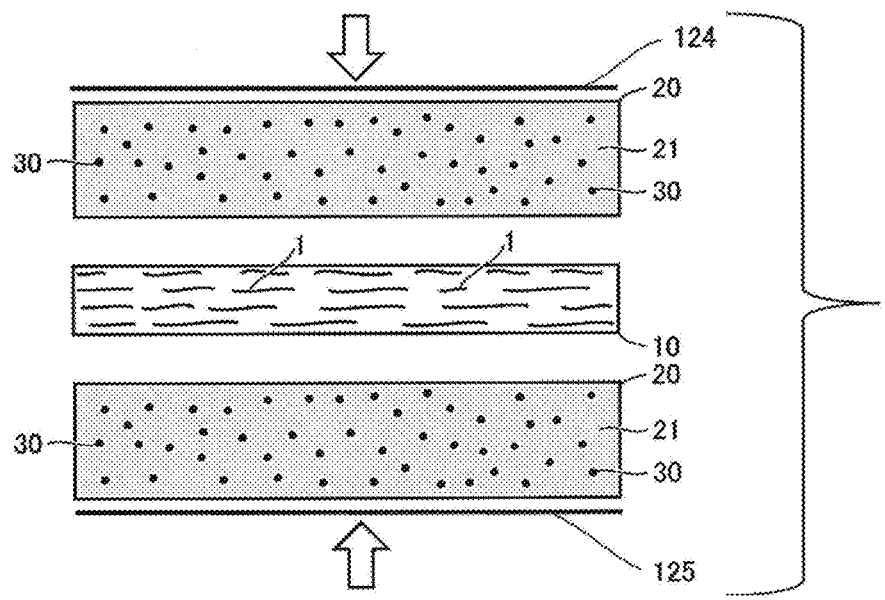
FIG. 20 is an illustration of a method for producing a hot press cushioning material shown in FIG. 19.

As shown in FIG. 20, a fiber sheet 10 comprised of a multiplicity of randomly oriented fibres 1, an unvulcanized rubber sheet 20 having thermally expandable microcapsule 30 dispersed therein, and two fluorine films 124, 125 are first prepared. In one embodiment, two unvulcanized rubber sheets 20 were prepared, and the two unvulcanized rubber sheets 20 are stacked on top of each other with the fiber sheet 10 interposed therebetween. The fiber sheet 10 can be in the form of nonwoven fabric or paper but is preferably in the form of paper produced especially by a wet papermaking process. The fiber sheet 10 in the form of paper has in-plane uniformity as fibers are randomly oriented in the in-plane direction in paper. In order for unvulcanized rubber 21 and the microcapsules 30 to enter the voids between the fibres 1, the fiber sheet 10 preferably has a void fraction of 84 to 99%.

One fluorine film 124 is placed on the front surface of the upper unvulcanized rubber sheet 20, and the other fluorine film 125 is placed on the back surface of the lower unvulcanized rubber sheet 20.

The multilayered structure of the upper and lower fluorine films 124, 125, the upper and lower unvulcanized rubber sheets 20, and the fiber sheet 10 which are stacked on top of each other as shown in FIG. 20 is pressed from above and below to form a composite sheet. This pressing is performed with this entire multilayered structure heated to an appropriate temperature. In one embodiment, this entire multilayered structure is pressed with a pressure of 0.7 MPa at 110° C. for 30 minutes, is then heated to 190° C. and pressed with a pressure of 0.7 MPa at 190° C. for 50 minutes, and thereafter is cooled for 10 minutes with the pressure being maintained at 0.7 MPa.

The above heating and pressing process causes a part of each of the upper and lower unvulcanized rubber sheets 20 to enter the voids between the multiplicity of fibers 1 in the fiber sheet 10, as shown in FIG. 19. Similarly, the above heating and pressing process also causes a part of the microcapsules 30 dispersed in the upper and lower unvulcanized rubber sheets 20 to enter the voids between the multiplicity of fibers 1 in the fiber sheet 10. The microcapsules 30 have not expanded at low temperatures.

The pressing is performed so that the remaining part of each of the upper and lower unvulcanized rubber sheets 20 does not penetrate the fiber sheet 10 but is located over and under the fiber sheet 10.

As the temperature is raised, the thermally expandable microcapsules 30 expand to form independent pores 3. The independent pores 3 are present in the fiber-rubber composite layer 121, the upper rubber layer 122, and the lower rubber layer 123.

As the temperature is further raised, the unvulcanized rubber 21 is vulcanized into vulcanized rubber 2.

Example Sample 5

A. Preparation of Materials

A fiber material sheet (glass paper) comprised of a multiplicity of randomly oriented glass fibers was prepared. The glass paper used was "GRABESTOS SYS-80" made by ORIBEST CO., LTD. The glass paper had a thickness of 0.57 mm, a basis weight of 80 g/m$^2$, and a void fraction of 95%.

Thermally expandable microcapsules were also prepared. The thermally expandable microcapsules used were "Expancel 920-DU120" made by Japan Fillite Co., Ltd. The thermally expandable microcapsules used in Example Sample 1 were "Expancel 920-DU40." These two types of thermally expandable microcapsules have the following differences.

(a) Expancel 920-DU40
Particle size (before expansion): 10 to 16 μm
Thermal expansion start temperature: 123 to 133° C.
Maximum thermal expansion temperature: 168 to 178° C.
(b) Expancel 920-DU120
Particle size (before expansion): 28 to 38 μm
Thermal expansion start temperature: 123 to 133° C.
Maximum thermal expansion temperature: 194 to 206° C.

5 parts by mass of the thermally expandable microcapsules (Expancel 920-DU120) were mixed per 100 parts by mass of fluororubber, and the mixture was kneaded to prepare two unvulcanized fluororubber sheets with a thickness of 0.75 mm. Each of the unvulcanized fluororubber sheets 20 had the thermally expandable microcapsules 30 dispersed therein.

Two fluorine films with a thickness of 12 μm were prepared.

As shown in FIG. 20, the fiber sheet 10 made of glass paper was sandwiched between the two unvulcanized rubber sheets 20 containing thermally expandable microcapsules. One fluorine film 124 was placed on the front surface of one unvulcanized rubber sheet 20, and the other fluorine film 125 was placed on the back surface of the other unvulcanized rubber sheet 20. This multilayered structure was hot pressed to form a composite sheet.

The pressing was performed under the following conditions. First, the multilayered structure was heated to 110° C. and was pressed with a pressure of 0.7 MPa at 110° C. for 30 minutes. Next, the multilayered structure was heated to 190° C. over a period of 20 minutes with the pressure being maintained at 0.7 MPa and was maintained at 190° C. for 50 minutes. The multilayered structure was then cooled to room temperature over a period of 10 minutes with the pressure being maintained at 0.7 MPa.

During the pressing at 110° C., a part of the unvulcanized rubber 21 and a part of the thermally expandable microcapsules 30 in each unvulcanized rubber sheet 20 containing the thermally expandable microcapsules 30 entered the voids between the multiplicity of fibers 1 in the fiber sheet 10. The pressing was performed so that the remaining part of each of the upper and lower unvulcanized rubber sheets 20 did not penetrate the fiber sheet 10 but was located over and under the fiber sheet 10.

The thermally expandable microcapsules expand during the heating from 110° C. to 190° C. to form independent pores in the fiber-rubber composite layer 121 and the upper and lower rubber layers 122, 123.

The unvulcanized fluororubber was vulcanized while the multilayered structure was maintained at 190° C. Thereafter, the multilayered structure was baked at 230° C. for 5 hours in order to improve the properties of the fluororubber.

The hot press cushioning material of Example Sample 5 produced as described above had the structure shown in FIG. 19. The thickness of Example Sample 5 was 2.34 mm. The volume ratio of the fiber material to the entire rubber 2 having the independent pores 3 dispersed therein was 1/48, and the overall porosity of the cushioning material was 35% based on volume.

[Image of Example Sample 5]

Figure 21:
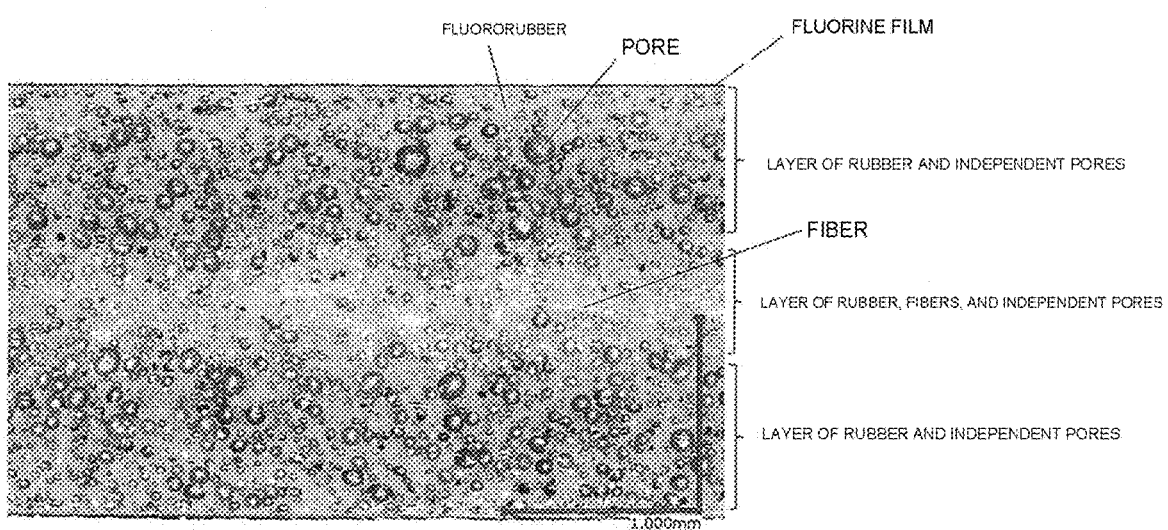
FIG. 21 is a sectional image of Example Sample 5 having the structure shown in FIG. 19.

FIG. 21 is a sectional image of Example Sample 5 having the structure shown in FIG. 19. As can be seen from the image, independent pores are present in the fiber-rubber composite layer (rubber+fibers+independent pores) located in the middle in the thickness direction. Independent pores are also present in the upper and lower rubber layers (rubber+independent pores).

[Comparison Between Example Sample 5 and Example Sample 1]

Example Sample 5 is different from Example Sample 1 in the following points.

(a) In Example Sample 1, no independent pores are present in the fluororubber layers 51 located over and under the fiber-rubber composite layer (fiber-rubber composite sheet) 50. In Example Sample 5, on the other hand, independent pores are present in the rubber layers 122, 123 located over and under the fiber-rubber composite layer 121.

(b) In the production process, in Sample Example 1, the fluororubber sheets 51 having a thickness of 50 μm are bonded to the front and back surfaces of the fiber-rubber composite layer (fiber-rubber composite sheet) 50. In Example Sample 5, on the other hand, a part of each of the upper and lower fluororubber sheets 20 enters the voids between the fibers of the fiber material sheet (glass paper) 10 to form the fiber-rubber composite layer 121, and the remaining part of each of the upper and lower fluororubber sheets 20 forms the upper and lower rubber layers 122, 123.

(c) The particle size before expansion of the thermally expandable microcapsules "Expancel 920-DU40" used in Example Sample 1 is 10 to 16 μm, while the particle size before expansion of the thermally expandable microcapsules "Expancel 920-DU120" used in Example Sample 5 is 28 to 38 μm. The size of the independent pores in Example Sample 5 is therefore larger than that of the independent pores in Example Sample 1.

The thickness reduction rate with repeated use is lower in Example Sample 5 than in Example Sample 1. Example Sample 5 has better conformability to unevenness than that of Example Sample 1.

[Comparison of Thickness Reduction Rate, Decrease in Void Fraction, and Conformability to Unevenness Between Example Sample 1 and Example Sample 5]

A press test was performed on Example Sample 1 and Example Sample 5 to measure a change in thickness and a change in void fraction with repeated press and evaluate conformability to unevenness. The configuration of a press used in the test is substantially the same as that shown in FIG. 10 except for the thickness of the spacer 104. The spacer 104 used in this test has a thickness of 0.2 mm and has a slit with a width of 0.5 mm.

The pressing for evaluation was performed under the following conditions.

Temperature: 200° C.

Pressure: 2 MPa

Pressing time: 60 minutes at high temperatures and 15 minutes at room temperature The measurement and evaluation results for Example Sample 1 and Example Sample 5 are shown in Table 3 below.

TABLE 3

| | Samples to be Evaluated | Initial | Single Press | 10 Presses | 50 Presses |
|---|---|---|---|---|---|
| Example 1 | Conformability to Unevenness (Step: 0.2 mm) | | Void Formed | — | — |
| | State | | Satisfactory | — | — |
| | Fiber/Rubber Volume Ratio | 1/9.5 | 1/9.5 | 1/9.5 | 1/9.5 |
| | Void Fraction | 50% | 45% | 41% | 32% |
| | Thickness | 1.32 mm | 1.21 mm | 1.13 mm | 0.98 mm |
| Example 5 | Conformability to Unevenness (Step: 0.2 mm) | | Satisfactory | Satisfactory | Satisfactory |
| | State | | Satisfactory | Satisfactory | Satisfactory |
| | Fiber/Rubber Volume Ratio | 1/48 | 1/48 | 1/48 | 1/48 |
| | Void Fraction | 35% | 34% | 32% | 30% |
| | Thickness | 2.34 mm | 2.31 mm | 2.25 mm | 2.18 mm |
| | LAYER OF FIBERS, RUBBER, AND INDEPENDENT PORES Fiber/Rubber Volume Ratio | 1/7.6 | 1/7.6 | 1/7.6 | 1/7.6 |
| | LAYER OF RUBBER AND INDEPENDENT PORES/ LAYER OF FIBERS, RUBBER, AND INDEPENDENT PORES Thickness Ratio | 1/3.7 | | | |

In Example Sample 1, the initial thickness (the number of times pressing was performed: 0) was 1.32 mm, and the thickness after 50 presses was 0.98 mm. In Example Sample 5, the initial thickness was 2.34 mm, and the thickness after 50 presses was 2.18 mm.

The thickness reduction rate ([initial thickness−thickness after 50 presses]/initial thickness) was about 26% in Example Sample 1 and about 7% in Example Sample 5.

In Example Sample 1, the initial void fraction was 50%, and the void fraction after 50 presses was 32%. The void fraction thus decreased by 18%. In Example Sample 5, the initial void fraction was 35%, and the void fraction after 50 presses was 30%. The void fraction thus decreased by 5%.

Figure 22:
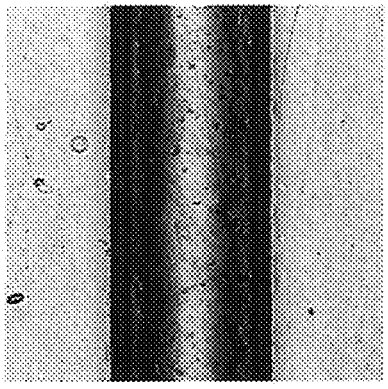
FIG. 22 shows images of a polyimide film in a stepped portion after press of the samples to be evaluated, showing comparison between Example Sample 1 having the structure shown in FIG. 5 and Example Sample 5 having the structure shown in FIG. 19

FIG. 22 shows images of the polyimide film 106 of FIG. 10 in the stepped portion. Since the thickness of the spacer 104 is 0.2 mm, the height of the step is 0.2 mm. As can be seen from the images after single press, a void was observed in Example Sample 1. On the other hand, no void was observed in Example Sample 5 even after 50 presses. The results show that Example Sample 5 has better conformability to unevenness to a large step (e.g., 0.2 mm) than Example Sample 1.

Although the embodiments of the present invention are described above with reference to the drawings, the present invention is not limited to the illustrated embodiments. Various modifications and variations can be made to the illustrated embodiments without departing from the spirit and scope of the invention.

INDUSTRIAL APPLICABILITY

The invention can be advantageously used as a hot press cushioning material that has satisfactory conformability to unevenness over long-term use.

REFERENCE SIGNS LIST

1 Fiber, 2 Rubber, 3 Independent Pore, 10 Fiber Material Sheet, 20 Unvulcanized Rubber Sheet, 21 Unvulcanized Rubber, 30 Thermally Expandable Microcapsule, 40 Unvulcanized Fluororubber Sheet Containing Thermally Expandable Microcapsules, 41 Glass Paper, 50 Fiber-Rubber Composite Sheet, 51 Fluororubber Sheet, 52 Fluorine Film, 60 Fiber-Rubber Composite Sheet, 61 Fluorine Rubber Sheet, 62 Fluorine Film, 70 Fiber-Rubber Composite Sheet, 71 Aramid Cloth, 72 Fluorine Rubber, 73 Fluorine Film, 80 stack of sheets of craft paper, 81 Thermoplastic Film, 90 Fluororubber Sheet, 91 Independent Pores, 100 Base, 101 Pressing Unit, 102 Cushioning Material, 103 Stainless Steel Sheet, 104 Spacer, 105 Release Film, 106 Polyimide Film With Adhesive, 107 Sample to be Evaluated, 108 Stainless Steel Sheet, 109 Cushioning Material, 120 Hot Press Cushioning Material, 121 Fiber-Rubber Composite Layer, 122 Upper Rubber Layer, 123 Lower Rubber Layer, 124 Upper Fluorine Film, 125 Lower Fluorine Film.

The invention claimed is:

1. A hot press cushioning material, comprising:
a fiber material comprised of a multiplicity of randomly oriented fibers;
rubber present in voids between the fibers of the fiber material; and
independent pores dispersedly present in the rubber,
wherein a volume ratio of the fiber material to the rubber present in the voids between the randomly oriented fibers is 1/15 or more and less than 1/7.5,
wherein a porosity of the hot press cushioning material is 15 to 60% by volume, and
wherein the voids between the randomly oriented fibers are completely filled with the rubber.

2. The hot press cushioning material according to claim 1, wherein the independent pores are formed by expansion of thermally expandable microcapsules dispersed in the rubber.

3. The hot press cushioning material according to claim 1, wherein
the fiber material contains one or more materials selected from the group consisting of glass, rock wool, carbon, polybenzazoles, polyimides, and polyamides.

4. The hot press cushioning material according to claim 1, wherein
the rubber contains one or more materials selected from the group consisting of fluororubber, ethylene-propylene rubber, hydrogenated nitrile rubber, silicone rubber, acrylic rubber, and butyl rubber.

5. The hot press cushioning material according to claim 1, wherein
the rubber includes one-side rubber layer located on one of upper and lower sides of a layer of the fiber material, and
the one-side rubber layer has independent pores dispersedly present therein.

6. The hot press cushioning material according to claim 5, wherein
the rubber includes the other-side rubber layer located on the other of the upper and lower sides of the layer of the fiber material, and
the other-side rubber layer has independent pores dispersedly present therein.

7. A hot press cushioning material, comprising:
a fiber-rubber composite layer comprised of a multiplicity of randomly oriented fibers; a rubber present in voids between the fibers; and independent pores dispersedly present in the rubber;
a one-side rubber layer located on one of upper and lower sides of the fiber-rubber composite layer comprising the rubber and the independent pores dispersedly present in the rubber;
an other-side rubber layer located on the other of the upper and lower sides of the fiber-rubber composite layer comprising the rubber and the independent pores dispersedly present in the rubber; and
wherein a volume ratio of the fibers to total rubber including the rubber in the fiber-rubber composite layer, the one-side rubber layer and the other-side rubber layer is 1/75 or more and less than 1/15,
wherein a porosity of the hot press cushioning material is 15 to 60% by volume, and
wherein the voids between the randomly oriented fibers are completely filled with the rubber.

8. A hot press cushioning material, comprising:
a fiber-rubber composite layer comprised of a multiplicity of randomly oriented fibers;
rubber present in voids between the fibers; and independent pores dispersedly present in the rubber;
a one-side rubber layer located on one of upper and lower sides of the fiber-rubber composite layer; comprising the rubber and the independent pores dispersedly present in the rubber;
an other-side rubber layer located on the other of the upper and lower sides of the fiber-rubber composite layer comprising the rubber and the independent pores dispersedly present in the rubber; and
wherein a ratio of a thickness of the fiber-rubber composite layer to a total thickness of the one-side rubber layer and the other-side rubber layer is 1/7 to 1/1.5;

wherein a volume ratio of the fibers to total rubber including the rubber in the fiber-rubber composite layer, the one-side rubber layer and the other-side rubber layer is 1/75 or more and less than 1/15, wherein a porosity of the hot press cushioning material is 15 to 60% by volume, and wherein the voids between the randomly oriented fibers are completely filled with the rubber.

9. A method for producing a hot press cushioning material, comprising the steps of:

stacking a fiber material sheet comprised of a multiplicity of randomly oriented fibers and an unvulcanized rubber sheet having thermally expandable microcapsules dispersed therein on top of each other;

pressing the stack of the fiber material sheet and the unvulcanized rubber sheet to cause unvulcanized rubber and the microcapsules in the unvulcanized rubber sheet to enter voids between the fibers of the fiber material sheet to form a composite;

heating the composite to cause expansion of the microcapsules to form independent pores; and heating the composite to vulcanize the unvulcanized rubber in the composite, wherein a volume ratio of the fiber material to the rubber present in the voids between the randomly oriented fibers is 1/15 or more and less than 1/7.5, wherein a porosity of the hot press cushioning material is 15 to 60% by volume, and wherein the voids between the randomly oriented fibers are completely filled with the rubber.

10. The method for producing a hot press cushioning material according to claim 9, wherein the stacking step includes sandwiching the unvulcanized rubber sheet between two of the fiber material sheets.

11. The method for producing a hot press cushioning material according to claim 9, wherein the step of pressing the fiber material sheet and the unvulcanized rubber sheet to form the composite is performed at a first temperature, the step of forming the independent pores is performed at a second temperature higher than the first temperature, and the vulcanizing step is performed at a third temperature higher than the second temperature.

12. The method for producing a hot press cushioning material according to claim 9, wherein the stacking step includes sandwiching the fiber material sheet between two of the unvulcanized rubber sheets.

13. The method for producing a hot press cushioning material according to claim 12, wherein the step of forming the composite includes causing a part of each of the unvulcanized rubber sheets containing the microcapsules to enter the voids between the fibers of the fiber material sheet and causing the remaining part of each of the unvulcanized rubber sheets to be located outside the fiber material sheet.

* * * * *